United States Patent [19]

Tanaka

[11] Patent Number: 5,086,618
[45] Date of Patent: Feb. 11, 1992

[54] TORQUE GENERATING DEVICE USING SHAPE MEMORY ALLOY

[75] Inventor: Makoto Tanaka, Tsukuba, Japan

[73] Assignee: Agency of Industrial Science & Technology, Ministry of International Trade & Industry, Tokyo, Japan

[21] Appl. No.: 654,780

[22] Filed: Feb. 13, 1991

[30] Foreign Application Priority Data

Feb. 16, 1990 [JP] Japan ................................. 2-36766

[51] Int. Cl.⁵ ............................................. F03G 7/06
[52] U.S. Cl. ..................................................... 60/527
[58] Field of Search ........................... 60/527, 528, 529

[56] References Cited

U.S. PATENT DOCUMENTS

| | | | |
|---|---|---|---|
| 3,430,441 | 3/1969 | Adams | 60/529 |
| 3,760,645 | 9/1973 | Soto et al. | 60/527 X |
| 4,938,026 | 7/1990 | Goldstein | 60/527 |

FOREIGN PATENT DOCUMENTS 2095338  9/1982  United Kingdom ................. 60/527

Primary Examiner—Allen M. Ostrager
Attorney, Agent, or Firm—Oblon, Spivak, McClelland, Maier & Neustadt

[57] ABSTRACT

Torque generating device using shape memory alloy consisting of multiple casings arranged at equal distances around the periphery of a rotatable wheel, each casing housing a coil of shape memory alloy. Part of the wheel is in a high temperature region where the temperature is higher than the transformation temperature of the shape memory alloy and part of the wheel is in a low temperature region where the temperature is lower than the transformation temperature of the shape memory alloy. When in the high temperature region the reversion force of the alloy rotates the rotatable wheel and in the low temperature region the alloy is forcibly deformed.

4 Claims, 2 Drawing Sheets

TORQUE GENERATING DEVICE USING SHAPE MEMORY ALLOY

BACKGROUND OF THE INVENTION

1. Field of the Invention

The present invention relates to a torque generating device which uses shape memory alloy to continuously convert heat energy to mechanical energy.

2. Prior Art Statement

Because geothermal water, heated waste water discharged by factories and other such low-grade heat energy cannot be readily converted into rotational or other such mechanical energy, in virtually all cases such energy is therefore discarded. There is thus a need for a way of effectively utilizing such energy.

In U.S. Pat. Application Ser. No. 433,137, now U.S. Pat. No. 5,031,711, the present inventor proposed a conveyance device which is operated by converting heat energy to mechanical rotational energy. In the conveyance device, a chassis supports a pair of pulleys separated by a prescribed distance, and an endless belt made of shape memory alloy runs between the pulleys One of the pulleys is maintained at a temperature which is higher than the transformation temperature of the shape memory alloy and the other pulley is maintained at a temperature that is lower than the transformation temperature. The shape memory alloy is provided with a curve which curves in the opposite direction to the belt's curvature around the pulleys, whereby as a result of the transformation force and reversion force the pulleys are turned by the belt and move the chassis Using a shape memory alloy with a low transformation point temperature would enables the device to be driven by low temperature heat energy, but because the shape memory alloy moves, being mounted on the chassis, it is difficult to use low grade heat energy as the source for heating the shape memory alloy.

The object of the present invention is therefore to provide a torque generating device which is able to continuously generate relatively large rotational energy by the conversion of low grade heat energy of 100° C. or less.

SUMMARY OF THE INVENTION

In accordance with the present invention, the above object is attained by a torque generating device comprising multiple torque generating means each comprised of a cylindrical casing, a shaft rotatably supported in the casing, and a coil of shape memory alloy housed in the casing with the inner end of the coil attached to the shaft and the outer end attached to the casing; a rotatable wheel which has a central shaft and supports the multiple torque generating means at an equidistant spacing around the periphery of the wheel, and part of the wheel is in a high temperature region where the temperature is higher than the transformation temperature of the shape memory alloy and part of the wheel is in a low temperature region where the temperature is lower than the transformation temperature of the shape memory alloy; a fixed wheel provided adjacent to the rotatable wheels; means provided in the high temperature region for rotating the rotatable wheel by using the reversion force of the deformed shape memory alloy to cause the casing to roll over the fixed wheel; and means provided in the low temperature regions for deforming the shape memory alloy in the casing by turning the shaft supported in the casing.

The shape memory alloy used for the torque generating means has a transformation temperature that is lower than the temperature of the heat energy which is to be used. When the alloy is deformed at below the transformation temperature to a shape with a different curvature from that of the memory shape and the torque generating means is located at a high temperature region, heating the alloy to above its transformation temperature causes it to revert to its memory shape and the resultant change in the curvature turns the casing over the fixed wheels, thereby rotating the rotatable wheels. When the torque generating is located at a low temperature region, cooling the shape memory alloy to below its transformation point, the alloy attempts to revert to its memory curvature but is forcibly further deformed by the rotation of the shaft, increasing the alloy's springback force at the high temperature region.

Therefore, the rotatable wheel is continuously rotated by arranging the multiplicity of torque generating means around the rotatable wheel so that they alternate between high temperature and low temperature locations.

Further features of the invention, its nature and various advantages will be more apparent from the accompanying drawings and following detailed description of the invention.

DETAILED DESCRIPTION OF THE PREFERRED EMBODIMENT

Figure 1:
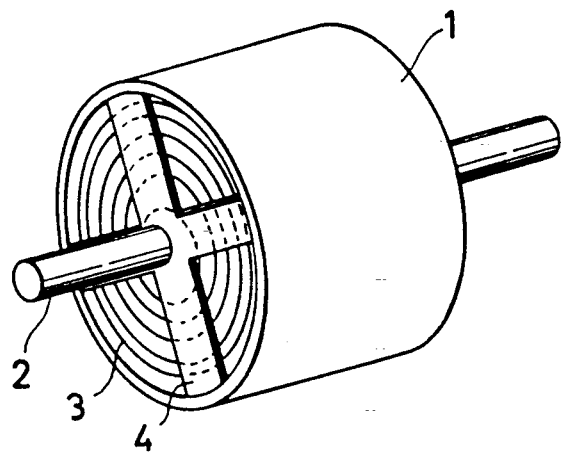
FIG. 1 is a perspective view of showing the basic arrangement of a torque generating unit of the torque generating device according to the present invention.

FIG. 1 shows the basic arrangement of the torque generating unit of the torque generating device according to the present invention. A cylindrical casing 1 is provided on the side surface thereof with a bearing plate 4 for rotatably supporting a shaft 2 thereon. The inner end of a multi-layered coil of shape memory alloy 3 is attached to the shaft 2 and the outer end is attached to the casing 1.

The shape memory alloy 3 is given a stored shape with enough curvature to make contact with the inside of the casing 1. When the alloy 3 which has been coiled around the shaft 2 at a temperature below its transformation point is heated to a temperature above the transformation point, it gives rise to a reversion force as the alloy 3 tries to return to the memory shape, whereby if the alloy has been fixed to the casing 1 the reversion force will cause the shaft 2 to turn, while if the alloy has been fixed to the shaft 2 it will cause the casing 1 to turn.

The shape memory alloy 3 can instead be given a memory shape with a curvature that winds it more tightly around the shaft 2. In this case, the alloy 3 is unwound at a temperature below its transformation point until it contacted the inner surface of the casing 1, and when it is then heated to above its transformation point the reversion force as the alloy 3 tries to return to its memory shape can be used to rotate either the shaft 2 or the casing 1.

There are many shape memory alloys with a transformation temperature of 30° C. to 40° C., and using such an alloy for the above torque generating unit will generate ample rotational force, even with low grade heat energy of up to 100° C.

As one example, titanium nickel shape memory alloy (transformation temperature 30° C.) 0.2 mm thick, 8 mm wide and 600 mm long was given sufficient shape memory curvature to bring it into contact with the inner surface of the housing. The inner end of the alloy was fixed to a shaft having a diameter of about 7 mm and the alloy was then wound round the shaft about ten times and the outer end fixed to the casing, forming a torque generating unit such as the one illustrated in FIG. 1. Tests were then conducted on the rotational motion thus achieved, which showed that when the shape memory alloy was heated by immersion in water at a temperature of about 70° C., the alloy generated a shaft torque of about 300 g.cm.

Figure 2:
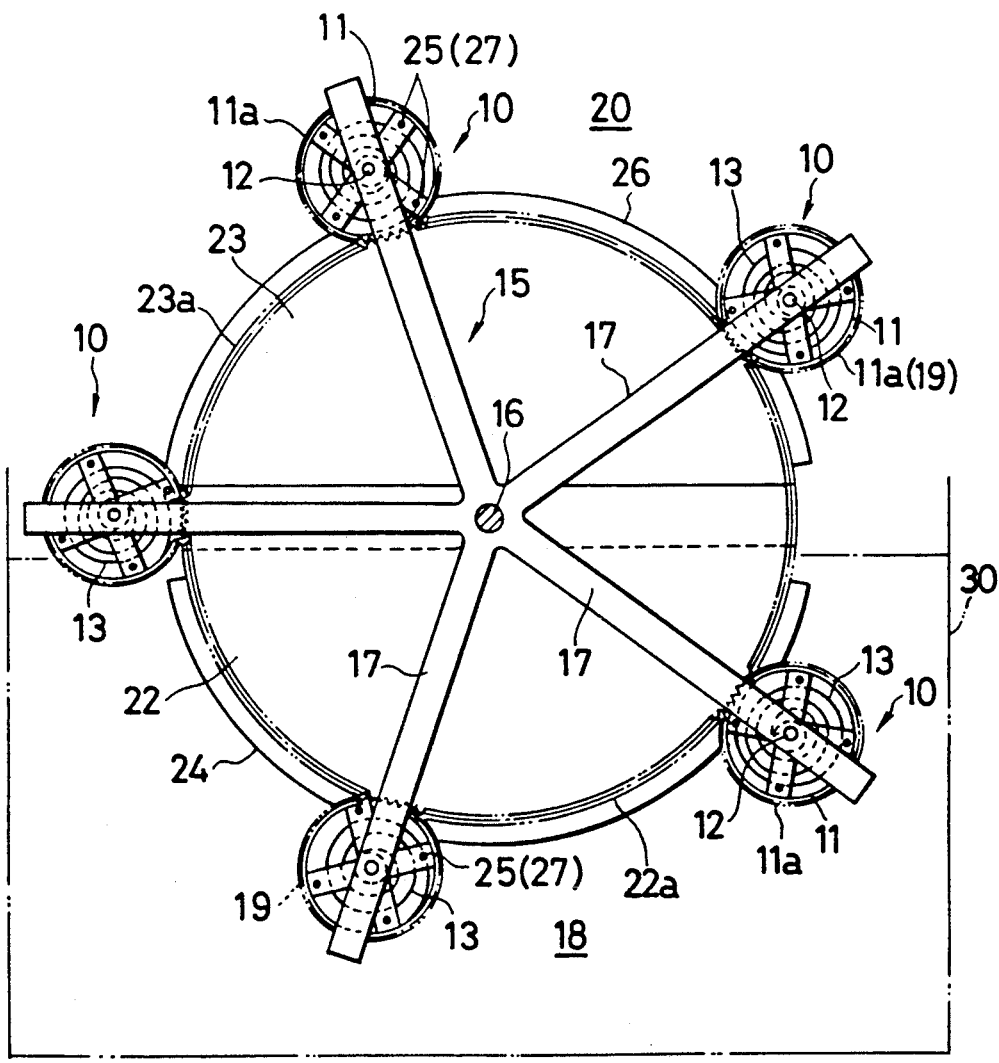
FIG. 2 is a front view of an embodiment of the torque generating device of the invention.
Figure 3:
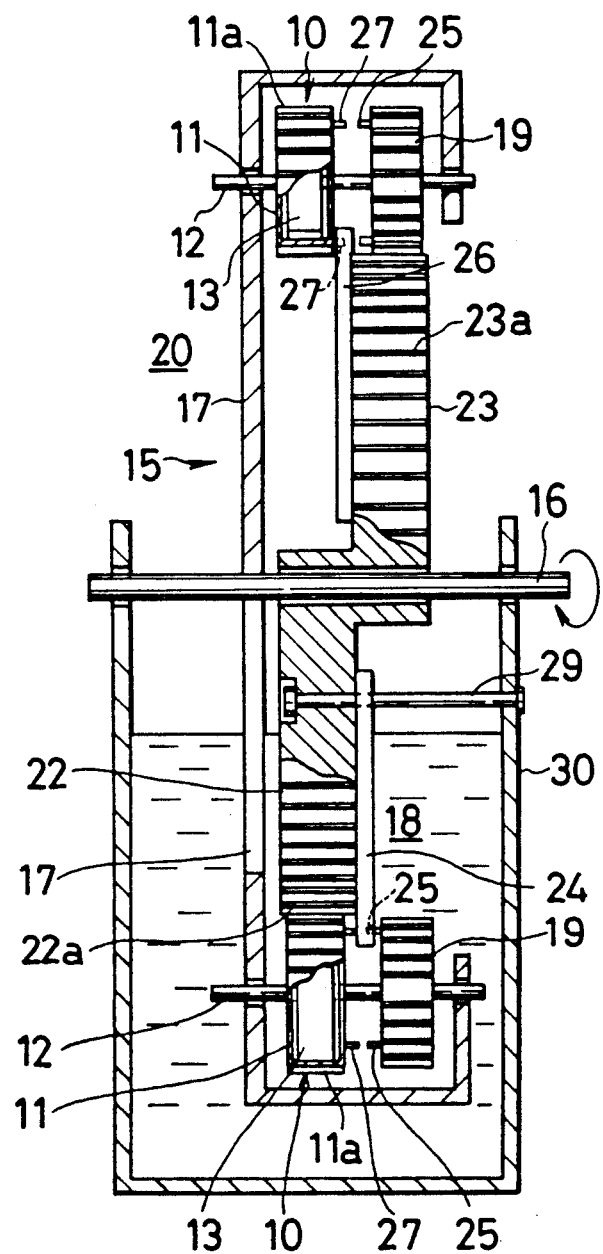
FIG. 3 is a partially-sectioned side view of two torque generating units of the torque generating device of FIG. 2, one being disposed in the high temperature region and the other in the low temperature region.

FIGS. 2 and 3 show an embodiment of the torque generating device comprising a multiplicity of the torque generating units of FIG. 1 to continuously generate a constant torque. In this arrangement the inner end of a coil of shape memory alloy 13 is attached to a shaft 12 and the outer end is affixed to a cylindrical casing 11. The outer periphery of the casing 11 has a gearwheel 11a formed thereon, and a plurality of pins 27 project from one side of the casing 11. A gearwheel 19 having the same configuration as the gearwheel 11a is affixed to the shaft adjacent to the casing 11, and the side of the gearwheel 19 facing the casing 11 has a plurality of pins 25. The side of the casing 11 is open to facilitate media contact at high or low temperature regions with the shape memory alloy 13 accommodated inside the casing 11. The arrangement described above is however not limitative and may be any other that accomplishes the object without departing from the scope of the invention.

A plurality of arms 17 are arranged so that they extend radially from a central shaft 16. The end of each of the arms 17 rotatably supports a shaft 12 of a torque generating unit 10. There are at least two arms 17 spaced equidistantly. The greater the number of arms 17 the greater the number of torque generating units and, hence, the smoother and larger the resultant torque A wheel 15 formed by the arms 17 each having a torque generating unit 10 mounted on the end is rotatably supported by the shaft 16 in a fixed portion such as a hot water bath 30 or the like which forms a high temperature region 18 so that one half of the wheel is in the high temperature region maintained at or above the transformation point temperature of the shape memory alloy 13 and the other half is in a low temperature region 20 such as the air which is at a temperature that is below the transformation point temperature. Provided in the high temperature region 18 with the shaft 16 at the center is a semicircular fixed wheel 22 with a gearwheel 22a on its outer periphery, the gearwheel 22a being arranged so that it engages with the gearwheel 11a of a torque generating unit 10 casing 11 in the high temperature region 18. Similarly, provided in the low temperature region 20 also with the shaft 16 at the center is a semicircular fixed wheel 23, and a gearwheel 23a provided on its outer periphery is arranged so that it engages with the gearwheel 19 affixed to a torque generating unit 10 shaft 12 in the low temperature region 20.

Provided along the outer periphery of the high temperature region 18 semicircular fixed wheel 22 is an engagement guide 24 with an L-shaped cross-section. When a torque generating unit 10 is in the high temperature region 18 the rotation of the gearwheel 19, that is to say, the rotation of the shaft 12 to which the gearwheel is attached, is stopped by engaging any of the pins 25 on the side of the gearwheel 19 with the inner edge of the engagement guide 24. Similarly, provided along the outer periphery of the low temperature region 20 semicircular fixed wheel 23 is an engagement guide 26 with an L-shaped cross-section, and when a torque generating unit is in the low temperature region 20 the rotation of the casing 11 is stopped by engaging any of the pins 27 on the side of the casing 11 with the inner edge of engagement guide 26.

Reference numeral 29 denotes a fixing bracket for fixing the fixed wheels 22 and 23 in the hot water bath 30 or the like which forms the fixed portion.

The operation of the torque generating device thus configured will now be explained. First, fluid energy having a temperature higher than that of the shape memory alloy is supplied to the hot bath 30 to form a high temperature region 18. In the high temperature region 18 the rotation of the shaft 12 to which the gearwheel 19 is affixed is stopped by engaging a pin 25 with the inner edge of the guide 24. The heat thus applied to the predeformed shape memory alloy 13 in the high temperature region 18 produces a reversion of the alloy to the memory shape, and the reversion force rotates the casing 11, and as the gearwheel 11a on the periphery of the casing 11 is in engagement with the gearwheel 22a on the fixed wheel 22, the casing 11 rotates along the fixed wheel 22, causing the rotation of the rotatable wheel 15 on which the casing 11 is supported.

In the low temperature region 20, as the gearwheel 19 is in engagement with the gearwheel 23a, the gearwheel 19 will be rotated by the rotation of the wheel 15, but rotation of the casing 11 which supports the shaft 12 on which the gearwheel 19 is affixed is prevented by the engagement between the casing pins 27 and the engagement guide 26, and as a result the rotation of the shaft 12 applies a forcibly deforming force to the shape memory alloy 13 the inner end of which is fixed. As the low temperature region 20 is maintained at a temperature that is lower than the transformation point temperature of the shape memory alloy 13 the alloy is in a state in which it is readily deformable, enabling ample storage in the alloy 13 of the plastic deformation accompanying the rotation of the shaft 12.

Thus, ample sequential deformations are applied to the shape memory alloy 13 in the casing coming to the low temperature region 20 and directed to the high temperature region 18. Regarding the casing coming from the low temperature region 20, sequentially the alloy is heated in the high temperature region 18 and reverts to its memory shape, turning the rotatable wheel 15 and generating a continuous torque on the shaft 16.

Although this embodiment is described with reference to an arrangement in which in the high temperature region 18 the shaft 12 is fixed and the shaft 15 is turned by the reversion force of the shape memory alloy 13 and in the low temperature region 20 the casing 11 is fixed and the shape memory alloy 13 is subjected to plastic deformation by the rotation of the shaft 12, the invention is not limited to this construction. Instead, any of various arrangements may be used whereby in the high temperature region 18 the reversion force of the shape memory alloy 13 causes the casing 11 to be rolled around the fixed wheel 22, bringing a turning force to bear with respect to the rotatable wheel 15, and in the low temperature region 20 the shape memory alloy 13 is subjected to the above deformation.

Also, in the above embodiment, in the high temperature region 18 the fixed wheel 22 engages with the gearwheel 11a on the casing 11 of the torque generating unit and in the low temperature region 20 the fixed wheel 23 engages with the gearwheel 19 on the shaft 12, the rotational may instead be transmitted by a frictional contact arrangement.

What is claimed is:

1. A torque generating device using shape memory alloy, comprising:
    multiple torque generating units each comprised of a cylindrical casing, a shaft rotatably supported in the casing, and a coil of shape memory alloy housed in the casing with the inner end of the coil attached to the shaft and the outer end attached to the casing;
    a rotatable wheel which has a central shaft and supports the multiple torque generating units at an equidistant spacing around the periphery of the wheel and can be turned by rotation of the shafts of the units;
    a fixed wheel having substantially the same shape as the rotatable wheel and which is provided adjacent to the rotatable wheel;
    a high temperature region which heats part of the rotatable wheel to a temperature higher than the transformation temperature of the shape memory alloy in the casing;
    a low temperature region which cools part of the rotatable wheel to a temperature lower than the transformation temperature of the shape memory alloy;
    means provided in the high temperature region for using the reversion force of the deformed shape memory alloy to rotate the casing on the fixed wheel and thereby cause the rotatable wheel to rotate; and
    means provided in the low temperature region for deforming the shape memory alloy in the casing by turning the shaft supported in the casing.

2. The torque generating device according to claim 1 in which the casing is cylindrical in shape and is provided on its peripheral surface with a gearwheel and a gearwheel is provided on the peripheral surface of the fixed wheel, and in the high temperature region the casing gearwheel engages with the fixed wheel gearwheel, causing the casing to roll on the fixed wheel.

3. The torque generating device according to claim 1 in which a shaft is rotatably supported in the casing and is provided on with a gearwheel, and in the low temperature region the gearwheel engages with the fixed wheel gearwheel, turning the shaft and applying deformation to the shape memory alloy.

4. The torque generating device according to claim 3 in which engagement guide means is provided on the peripheral surface of the fixed wheel and the casing and the gearwheel have pin means to engage with the guide means whereby in the high temperature region the gearwheel pin means engage with the guide means, preventing rotation of the shaft, and in the low temperature region the casing pin means engage with the guide means, preventing rotation of the casing.

* * * * *